(12) United States Patent
Wöstmann et al.

(10) Patent No.: US 12,151,425 B2
(45) Date of Patent: Nov. 26, 2024

(54) METHOD FOR PRODUCING A HELICAL CASTING PATTERN

(71) Applicant: Fraunhofer-Gesellschaft zur Foerderung der angewandten Forschung e.V., Munich (DE)

(72) Inventors: Franz-Josef Wöstmann, Bremen (DE); Matthias Busse, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 75 days.

(21) Appl. No.: 17/045,966

(22) PCT Filed: Apr. 11, 2019

(86) PCT No.: PCT/EP2019/059358
§ 371 (c)(1),
(2) Date: Oct. 7, 2020

(87) PCT Pub. No.: WO2019/197586
PCT Pub. Date: Oct. 17, 2019

(65) Prior Publication Data
US 2021/0023769 A1     Jan. 28, 2021

(30) Foreign Application Priority Data
Apr. 12, 2018   (DE) .................. 102018205585.8

(51) Int. Cl.
*B29C 59/02*   (2006.01)
*B29C 59/08*   (2006.01)
*B29C 59/16*   (2006.01)

(52) U.S. Cl.
CPC .............. *B29C 59/02* (2013.01); *B29C 59/08* (2013.01); *B29C 59/16* (2013.01); *B29C 2059/028* (2013.01)

(58) Field of Classification Search
CPC ............ B22C 7/02; B22C 7/023; B29C 59/02; B29C 59/08; B29C 59/16; B23B 5/46; B23B 5/48; B23D 5/02
See application file for complete search history.

(56) References Cited

U.S. PATENT DOCUMENTS

| 141,347 | A | * | 7/1873 | Heer ................... B23B 5/48 142/35 |
| 3,466,743 | A | * | 9/1969 | De Puy ............... H01F 41/04 83/33 |

(Continued)

FOREIGN PATENT DOCUMENTS

| DE | 102011110044 A1 | 2/2013 |
| JP | 04171110 A * | 6/1992 |

(Continued)

OTHER PUBLICATIONS

Groninger, M., et al, "Casting production of coils for electrical machines", 2011, 1st International Electric Drives Production Conference, IEEE, pp. 159-161. (Year: 2011).*

(Continued)

*Primary Examiner* — Jerzi H Moreno Hernandez
(74) *Attorney, Agent, or Firm* — Faegre Drinker Biddle & Reath LLP

(57) ABSTRACT

A method for producing a helical casting pattern. The method including: providing a pattern body having a longitudinal axis, a cavity extending in the direction of the longitudinal axis, and a pattern body wall that surrounds the cavity; providing a processing tool for creating a recess; arranging the pattern body and the processing tool such that the processing tool extends at least partially through the pattern body wall in the radial direction with respect to the longitudinal axis; and rotatably driving at least one of the processing tool and the pattern body about one of the longitudinal axis of the pattern body and an axis parallel (Continued)

thereto, relative to one another, with a relative movement between the pattern body and the processing tool in a direction parallel to the longitudinal axis being produced one of continuously or at least intermittently during or in alternation with the relative rotational movement.

17 Claims, 6 Drawing Sheets

(56) References Cited

U.S. PATENT DOCUMENTS

| | | | | |
|---|---|---|---|---|
| 3,564,188 | A * | 2/1971 | Dathe | B23H 11/003 83/109 |
| 3,915,210 | A * | 10/1975 | McCord, Jr. | B27C 7/005 451/220 |
| 4,413,540 | A * | 11/1983 | Burge | B26D 3/28 144/365 |
| 5,197,527 | A * | 3/1993 | Namba | B22C 7/023 164/45 |
| 5,893,204 | A * | 4/1999 | Symonds | B22C 9/04 76/108.4 |
| 11,676,760 | B2 * | 6/2023 | Sasaki | H01F 41/04 29/602.1 |
| 2006/0230889 | A1 * | 10/2006 | Kimura | B23B 1/00 82/1.11 |
| 2007/0233043 | A1 * | 10/2007 | Dayton | A61B 1/00071 604/526 |
| 2007/0295175 | A1 * | 12/2007 | Akiyama | B23B 5/48 82/117 |
| 2016/0158964 | A1 * | 6/2016 | Miarecki | B62D 35/00 415/173.1 |
| 2019/0210286 | A1 * | 7/2019 | Newell | B29C 64/241 |
| 2021/0121960 | A1 * | 4/2021 | Busse | B22F 5/106 |
| 2021/0178460 | A1 * | 6/2021 | De Luca | B22D 11/057 |
| 2021/0367490 | A1 * | 11/2021 | Busse | B22C 9/046 |

FOREIGN PATENT DOCUMENTS

| | | | | |
|---|---|---|---|---|
| JP | 2008138739 A | * | 6/2008 | |
| JP | 2015009259 A | * | 1/2015 | |
| KR | 20170040404 A | * | 4/2017 | ......... H02K 15/0442 |
| WO | WO-2019066568 A1 | * | 4/2019 | ............. H02K 15/04 |

OTHER PUBLICATIONS

Brooks Hadley., "Plastic Foam Cutting Mechanics for Rapid Prototyping and Manufacturing Purposes," Retrieved from the Internet: https://core.ac.uk/download/pdf/35461197.pdf , Jan. 1, 2009, 246 pages.

Hamade et al., "Modelangelo: a subtractive 5-axis robotic arm for rapid prototyping," Robotics and Computer-Integrated Manufacturing, vol. 21, No. 2, Apr. 1, 2005, pp. 133-144.

Hope et al., "Rapid prototyping with sloping surfaces," Rapid Prototyping Journal, vol. 3, No. 1, Mar. 1, 1997, pp. 12-19.

International Preliminary Report on Patentability received for PCT Patent Application No. PCT/EP2019/059358, mailed on Oct. 22, 2020, 18 pages (9 pages of English Translation and 9 pages of Original Document).

International Search Report and Written Opinion received for PCT Patent Application No. PCT/EP2019/059358, mailed on Jul. 18, 2019, 21 pages (9 pages of English Translation and 12 pages of Original Document).

Kumar et al., "Rapid Prototyping of EPS Pattern for Complicated Casting," Solid Freeform Fabrication: Proceeding of the 28th Annual International Solid Freeform Fabrication Symposium—An Additive Manufacturing Conference Reviewed Paper, Sep. 7, 2017, pp. 1877-1885.

Zhu et al., "An 8-Axis Robot Based Rough Cutting System for Surface Sculpturing," Towards Synthesis of Micro-/Nano-systems, Jan. 1, 2007, pp. 139-144.

* cited by examiner

METHOD FOR PRODUCING A HELICAL CASTING PATTERN

CROSS-REFERENCE TO RELATED APPLICATION

This application is a 371 National Stage Application of International Application No. PCT/EP2019/059358, filed 11 Apr. 2019, which claims priority to German Application No. 10 2018 205 585.8, filed 12 Apr. 2018, both of which are herein incorporated by reference in their entireties.

TECHNICAL FIELD

The disclosure resides in the field of mechanical engineering, and more specifically in the field of casting technology, and can be used particularly advantageously in methods in which a lost pattern is used, for example in what is known as lost foam casting or full mold casting, as well as in investment casting. When helical bodies are to be produced in a casting process, the lost mold casting process is particularly well-suited for this purpose.

BACKGROUND

Lost molds can be produced in the form of dissolvable pattern bodies, which are dissolved, for example during metal casting, by the hot molten metal and volatilize, or escape from the space taken up by the lost mold and are displaced by the molten metal.

Depending on the complexity of the bodies to be cast, such pattern bodies, which essentially predefine the shape for the bodies to be produced later in the casting process, can be complex. In particular during the production of springs or coils, there are additional requirements with respect to the electrical conductivity and/or the homogeneity of material properties.

It is known from the related art to mill such pattern bodies from a suitable material, for example a foam material or a wax, or to cut these using a hot wire. Series production is conceivable, for example, by foaming using foaming tools. Due to the complexity of the desired end products, partial geometries often have to be produced separately and joined to form a pattern body. The joints of such partial pattern bodies are generally problematic since these may lead to casting defects or inhomogeneities of the material properties during the casting process. Depending on the number of partial pattern bodies to be joined, and the number of parts to be produced annually, this joining process can become uneconomical.

SUMMARY

It is an object of the present disclosure to create a method for producing a helical casting pattern that, with little effort, also allows complex casting patterns to be produced in high volume, while being variable in such a way that the shape of the casting pattern can be easily adapted to changed requirements of the cast body.

Accordingly, the disclosure relates to a method for producing a helical casting pattern, in which a strand-shaped pattern body, in particular made of copolymer or a wax, having a centric longitudinal axis, a centric cavity extending in the direction of the longitudinal axis, and a pattern body wall on the one hand, which surrounds the cavity, and a processing tool for creating a recess on the other hand, are arranged in such a way that the processing tool extends at least partially, and in particular completely, through the pattern body wall in the radial direction with respect to the longitudinal axis, and the processing tool and/or the pattern body are rotatably driven about the longitudinal axis of the pattern body, or an axis parallel thereto, relative to one another, wherein a relative movement between the pattern body and the processing tool in a direction parallel to the longitudinal axis is produced continuously or at least intermittently during, or in alternation with, the rotational movement.

The processing tool is configured so as to displace, remove or erode the material of the pattern body, or to deliberately create a cavity in the material in another manner. This can in particular take place in a single operation. It is also possible, in some embodiments, to use a hot air stream, a water jet or a laser beam as the processing tool. The source of the stream, jet or beam is located in the center of the pattern to be processed. For processing, the source and/or the pattern can rotate, move up and down on the z axis, and move on a curve track in the x-y plane, in particular for setting a constant distance between the source and the processing point. The movement for producing the spiral is carried out, for example, as with the processing tool described above.

Proceeding from a pattern body, which can have the design of a prism, a cylinder or a cuboid, for example, and has a cavity in the interior thereof, a helical recess is thus introduced into the pattern body by a processing tool. For this purpose, the processing tool is arranged inside the cavity in the interior of the pattern body and pivoted so as to extend through the pattern body wall and remove or displace the material of the pattern body. For this purpose, as will be outlined below in greater detail, the processing tool can be designed in the manner of a saw blade, a rasp or in the form of a heating wire.

In embodiments, materials include, for example, thermoplastic materials in general, which are melted or gasified at the temperature of the metal to be cast during the casting process and exit the mold. For example, the following substances can be used as exemplary thermoplastic materials: acrylonitrile butadiene styrene (ABS), polyamide (PA), polylactate (PLA), polymethylmethacrylate (PMMA), polycarbonate (PC), polyethylene terephthalate (PET), polyolefins, such as polyethylene (PE) and polypropylene (PP), polystyrene (PS), polyether ether ketone (PEEK) and polyvinyl chloride (PVC), and celluloid. Some embodiments use waxes, as they are used in investment casting, or mixture of waxes and plastic materials.

Since the processing tool is able to rotate or pivot about a longitudinal axis of the pattern body, it is possible, in embodiments, to introduce a substantially disk-shaped recess into the pattern body. Simultaneously with or alternating to this movement, the processing tool can be moved along the longitudinal axis of the pattern body, so that the movement track of the processing tool is oblique in relation to the longitudinal axis of the pattern body, thereby creating a helical recess in the pattern body wall.

During a non-continuous advancement movement of the processing tool, it is also possible to create a recess that is arranged in a circular disk-shaped manner in the pattern body wall and continues in a stepped manner along the longitudinal axis of the pattern body, so as to then continue again as a circumferential disk-shaped recess. This creates a stepped helical recess in the pattern body.

In any case, a continuous recess is created in the pattern body, which is configured in such a way that the portion of the pattern body that remains has the shape of a helix. When, according to the lost mold or lost pattern method, molten metal is then poured or cast into the casting pattern so as to create a cast body, the cast body thus also has the shape of a helix and can, for example, be used as an electrical coil or as a helical spring.

If, in terms of the arrangement of the cavity in the pattern body, the cavity is arranged symmetrically to the longitudinal axis of the pattern body, a circumferential pattern body wall having a uniform thickness can be obtained. If the cavity is not symmetrically arranged in the pattern body, a pattern body wall having a variable thickness along the circumference of the pattern body is obtained. The cavity can moreover vary along the longitudinal axis of the pattern body, for example can extend conically or in a pyramid shape. This results in a variable wall thickness of the pattern body wall along the longitudinal axis of the pattern body. These measures result in a variable thickness of the windings of the resulting coil or spring in the cast body created later. The pitch of the helical recess in the pattern body wall can also be varied during the creation or during the introduction of the recess into the pattern body wall, by varying the speed of the advancement movement of the processing tool in relation to the rotational speed of the processing tool.

The helical casting pattern is advantageously shaped and dimensioned so as to have the inherent stability necessary for further use in the process, and so as not to noticeably deform, neither due to its own weight, nor as a result of minor impact during handling. The possible dimensions accordingly depend, among other things, on the material of which this is produced.

In embodiments, the individual windings of the helical pattern, which each have a strand-shaped design, have a rectangular or oval cross-sectional shape. The dimensions of this cross-sectional shape of the strand forming the helix can be indicated in the radial direction with respect to the longitudinal axis of the helical pattern body, and in the radial direction with respect to the same longitudinal axis. These dimensions can, for example, be indicated as fractions or multiples of the radius of the helical pattern body at the point of the largest radius (r) thereof. The dimension of the cross-section of the strand-shaped helix, for example, can then be at least 0.1 r, and in particular at least 0.2 r or 0.3 r, in the radial direction. This extension can, for example, also be less than 0.8 r, and in particular less than 0.5 r. For example, this dimension can be between 0.1 r and 0.8 r, or between 0.2 r and 0.5 r, or between 0.3 r and 0.5 r.

Moreover, for example, the extension of the helix can be at least 0.1 r, and in particular at least 0.2 r or 0.3 r, in the axial direction with respect to the longitudinal axis. This extension can, for example, also be less than 0.8 r, and in particular less than 0.5 r. For example, this dimension can also be between 0.1 r and 0.8 r, or between 0.2 r and 0.5 r, or between 0.3 r and 0.5 r.

The cross-sectional shape of the strand forming the helix can be square, for example. The ratio of the extension of the cross-section in the axial direction to the extension in the radial direction with respect to the longitudinal axis can, for example, be between 0.3 to 1 and 1 to 0.3, and in particular between 0.5 to 1 and 1 to 0.5.

The cross-sectional size of the helix, indicated in units of the radius r of the helix, can be greater than $0.01\ r^2$, in particular greater than $0.05\ r^2$, and furthermore in particular greater than $0.1\ r^2$. This size information may apply, for example, in the case where the helix is made of wax.

If the helix is made of a resin, a copolymer or a thermoset material or, generally speaking, of a plastic material, the individual linear dimensions can satisfy the same conditions, or also be considerably smaller, for example less than half the dimensions indicated above, and the cross-sectional surface areas can be less than 0.3 times the indicated dimensions.

Embodiments, of the method may provide, for example, that the rotational speed of the rotating relative movement between the processing tool and the pattern body and/or the speed of the relative movement between the processing tool and the pattern body in the direction of the longitudinal axis remains constant during the production of the pattern body, at least during a time segment. This results in at least one section of the pattern body along the axis thereof in which the recess, introduced into the pattern body by the processing tool, has the shape of a helix having a constant pitch.

In embodiments, it is also possible that the introduced recess, along the progression thereof, in sections extends parallel to the longitudinal axis of the pattern body, namely when the rotational movement of the processing tool is halted during a time segment, and the processing tool is moved exclusively in a direction parallel to the longitudinal axis of the pattern body. On the other hand, the recess can also extend, in spots or in sections, in a plane perpendicular to the longitudinal axis of the pattern body, namely when the processing tool is moved exclusively by a rotational movement about the axis of the pattern body in a time segment of the processing operation, without an advancement movement parallel to the longitudinal axis of the pattern body taking place during this time segment.

In embodiments, it can also be provided that the rotational speed of the rotating relative movement between the processing tool and the pattern body and/or the speed of the relative movement between the processing tool and the pattern body in the direction of the longitudinal axis is changed during the production of the pattern body. In this case, the helical recess in the pattern body does not represent a helix having a constant pitch, but the pitch of the helix is variable along the longitudinal axis of the pattern body.

In embodiments, it may also be provided that two or more processing tools are moved simultaneously, and in particular jointly, relative to the pattern body. In this case, for example, multiple helical recesses can simultaneously be introduced into the pattern body, which are arranged inside one another and shifted with respect to one another in the direction of the longitudinal axis of the pattern body. In this way, multiple interlaced helical pattern bodies are created, or a pattern body including multiple interlaced helical sections is created.

Also, embodiments of the method may provide that at least one processing tool comprises a strand or strip, in particular made of metal, which is retained between two bearing points and held tautly during the relative movement of the pattern body and the processing tool. For example, one of the bearing points can be arranged inside the cavity of the pattern body, and the second can be arranged radially outside the pattern body. The strand or strip held tautly between these, which forms an integral part of the processing tool, thus extends through the pattern body wall and can, for example, be designed in the manner of a rasp, or a saw blade, or also heatable in the manner of a hot wire.

However, it is also possible that at least one processing tool comprises a strand-shaped or strip-shaped processing body that is exclusively held at a first of the ends thereof. In this case, the processing tool is designed to be sufficiently rigid, so as to be able to be held at one of the ends thereof, in particular inside the cavity, and moved through the pattern body wall. The processing tool can be designed as a stiff wire or a metal panel or the like in this case, wherein the strip, wire or panel can be straight, or also bent. In particular in the design as a hot wire, desired shaping of the individual helical turns of the pattern body can be achieved by way of a contour of the hot wire. It is also possible to use several such processing tools simultaneously, which have different angles of attack, so that an initial cut of the contour of the individual helical turns of the pattern body can be achieved.

In embodiments, for example, it may also be provided that, when forming a recess in the pattern body, a marking can be deliberately introduced, for example by way of notching, which can be used in a later method step to position a tool or a mold.

It may also be provided that at least one processing tool comprises a rotatably drivable circular disk. The rotatably drivable circular disk can be used to introduce a cut into the pattern body, wherein the circular disk can either be designed as a knife or as a circular saw blade.

In addition to the option of introducing a recess into the pattern body by processing using cutting or removing, it may also be provided that at least one processing tool is heated during the production process. When the processing tool is heated to temperatures in the range of the melting point of the material of which the pattern body is made, the method of hot wire cutting can be employed.

If processing by way of cutting or removing is desired using a strand-shaped processing tool, it may be provided that this is rotatably driven about the longitudinal axis thereof during the production process. For this purpose, the processing tool can comprise teeth or particles or at least a roughness on the outer circumference thereof, resulting in rasp-like removal of the pattern body.

As an alternative or in addition, a strand-shaped processing tool can also vibrate during the production process, or move in an oscillating manner in the direction of the longitudinal axis thereof. In this way, the processing tool carries out a saw-like oscillating movement for removing material of the pattern body. The stroke of this oscillating movement can vary between fractions of millimeters and several millimeters.

In the method, it may be provided that outer dimensions of the pattern body and/or dimensions of the cavity along the longitudinal axis vary. For example, the pattern body or the outer dimensions thereof can taper in the direction of the longitudinal axis. The outer dimensions can, as an alternative or in addition, have a variable geometry along the longitudinal axis. For example, the pattern body can have a rectangular or a round base surface. The outer dimensions of the pattern body can form a polyhedron, and in particular a cuboid or a frustrum of a pyramid, a cylinder or a frustrum of a cone. In the case of polyhedral pattern bodies, the edges, or at least a portion of the edges, and in particular those edges that extend from the top side to the bottom side, can be rounded. As mentioned, as an alternative or in addition to the outer dimensions, the cavity can vary along the longitudinal axis, for example can taper or change the geometric shape thereof. The geometric shape of the inner cavity can coincide with the outer shape of the pattern body (for example, both can be cylindrical, or both can be conical, or both can be cube-shaped, or both can be pyramid-shaped), or can deviate therefrom (for example, a cylindrical recess can be provided in a cube-shaped pattern body, or vice versa).

In embodiments of the method, the pattern body is mounted in a suspended manner while the recess is being created, by being attached in an upper region. The recess can then be introduced from the bottom to the top, for example. In this way, it is achieved by the weight that the strand gradually separated from the remaining pattern body, as the recess is being introduced, is pulled away downwardly. In this way, undesirable reconnection of the strand to the remaining pattern body, or a strand section located thereabove, can be avoided. This can, in particular, be useful when the introduction of the recess is carried out using a hot processing tool, and partial melting of the strand presents a risk of reconnection when the separated strand and the remaining pattern body come in contact with one another. So as to prevent undesirable or excessive deformation as a result of the inherent weight, a receiving plate can be provided beneath the processing device, which moves along in a rotatory and/or translatory manner. The plate can receive the detached strand, which is pulled downwardly by gravity, deforming the pattern body, and in this way limit the deformation of the pattern body.

In embodiments of the method, a groove is introduced into the pattern body, which extends in the pattern body wall along the inside or the outside, orthogonal to the longitudinal axis, or which, proceeding from the recess, extends in the direction of the longitudinal axis. The processing device can comprise a groove cutter for this purpose. The groove cutter can be a processing tool within the meaning of the present application, which extends, in the radial direction, only partially through the pattern body wall. Proceeding from the processing tool, the groove cutter can extend in the direction of the longitudinal axis, for introducing a groove that extends in the direction of the longitudinal axis. As an alternative or in addition, the groove cutter can be connected, as a separate processing tool, by way of a second arm to the shaft of the processing device, in particular for providing a groove on the inside of the pattern body wall. As an alternative or in addition, the groove cutter can accordingly be arranged on the outside for introducing a groove on the outside of the pattern body wall, for example by being attached to the same arm as the processing tool by way of a connecting piece.

In embodiments, it may be provided in the method that a contour of the strand is processed at the same time that the recess is introduced, by way of the processing tool. In the process, edges of the strand can be rounded and/or functional contours can be introduced, for example by an appropriately configured processing tool. The functional contour can, for example, include one or more cooling fins and/or one or more positioning aids and/or one or more mounting aids and/or one or more cooling channels. So as to create a cooling channel, a depression can be introduced on one or more sides of the strand, in particular in the form of the aforementioned groove, and the depression can then be closed again, in particular by pressing together adjoining windings, which is a possible choice, for example, when the depression is provided on a top side and/or a bottom side of the strand.

In embodiments, it may be provided in the method that, in addition to the rotational movement of the processing tool and/or of the pattern body, a second relative movement takes place between the processing tool and the pattern body, which is oriented orthogonal to the longitudinal axis, wherein the rotational movement and/or the relative movement, along the longitudinal axis, are superimposed at least intermittently by the second relative movement and/or wherein the rotational movement and/or the relative movement, along the longitudinal axis, are at least intermittently interrupted during the second relative movement. In this way, it is made possible, in particular, to also process components that are not rotation-symmetrical in such a way that, in addition to the recess, also grooves or other functional contours are introduced, or edges are rounded. For example, in the case of oval or rectangular pattern bodies, corresponding curve tracks can be selected, resulting, for example, in a constant distance between the point undergoing processing and the center. As a result of the aforementioned second relative movement, it is also possible, however, to control or vary a certain progression of a groove, or a depth of a groove (both in the case of bodies that are rotation-symmetrical and those that are not rotation-symmetrical).

In addition to a method of the type described above, the disclosure also relates to a processing device for a helical casting pattern. The object according to the invention is achieved, in the case of such a processing device, by a processing tool for creating a recess in a pattern body, and a first drive device for driving, in a rotatory manner, a pattern body and/or a processing tool relative to one another about an axis that is parallel to the longitudinal axis of the pattern body, or identical thereto, and a second drive device for driving, in a translatory manner, the pattern body and/or the processing tool relative to one another in a direction parallel to the longitudinal axis of the pattern body.

As a result of a suitably controlled movement of the processing tool during the operation thereof, the desired shape can be imparted to the recess in the pattern body created by the processing tool, in a coordinated movement by the first and second drive devices. The drive devices are usually of an electromechanical nature, that is, for example, designed as a rotary motor or as a linear motor. In particular when an oscillating movement of the processing tool is to be produced, it is also possible to employ any type of electromagnetic or electromechanical oscillator as a drive unit.

In embodiments, it may be provided that the processing tool is configured to create one or more recesses in the pattern body, and in particular to process the pattern body by way of cutting or erosion or local melting.

Regardless of the type of operation of the processing tool, the processing device advantageously provides a control unit, which controls the first drive device and the second drive device in a coordinated manner.

If the processing tool is operated in the manner of a hot wire, this requires a heating device for the processing tool.

If cutting or rasp-like processing of the pattern body by the processing tool is desired, the need arises for a drive device for driving the processing tool in a vibrating manner, an oscillating manner or in a rotating manner about its own longitudinal axis.

If fastening elements or connecting elements are provided on the coil/winding/spring to be produced, these can already be provided, in the geometries thereof, in the primary material, introduced into the pattern by the processing movement, or attached by subsequently joining separate elements. These regions may deviate from the shape of the winding, and may be specifically designed for being screwed, pressed, crimped, soldered or welded together, and include a connecting element, for example, for supplying and removing a cooling medium.

BRIEF DESCRIPTION OF THE DRAWINGS

The disclosure will be shown and described hereafter based on exemplary embodiments in figures of a drawing. In the drawings.

DETAILED DESCRIPTION

Figure 1A:
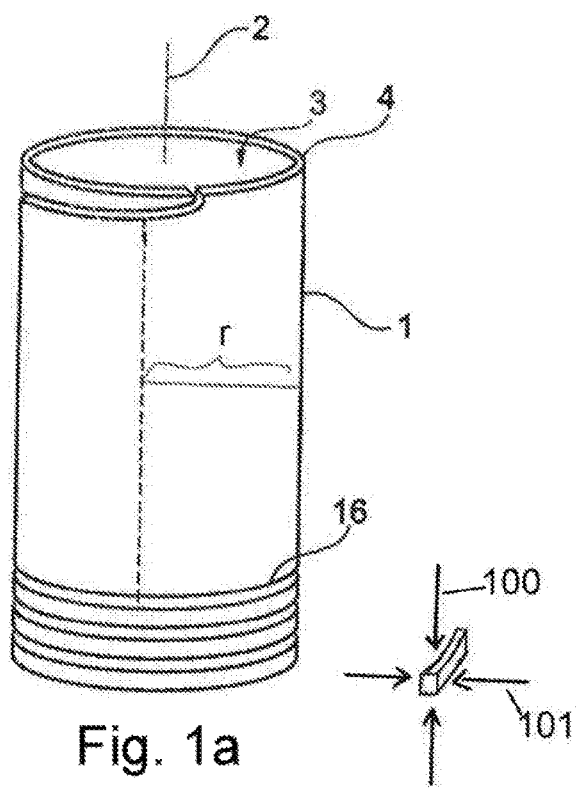
FIGS. 1a-1c show helical casting patterns in perspective illustrations, according to embodiments of the disclosure.

FIG. 1a shows a helical casting pattern 1, which is composed of a hollow cylinder having an interior cavity 3, wherein a helical recess 16 has been introduced into the cylinder wall/pattern body wall 4. The portions of the cylinder wall 4 remaining between the individual turns of the recess 16 extending helically around the circumference form a helical body, which can serve as a casting pattern in lost mold processes for casting a metal cast body. A metallic coil body or a helical spring or coil spring can be produced thereby in a subsequent casting process.

A section of the strand forming the helix is shown on the bottom right of FIG. 1a. A cross-section is shown, which is square. The extension of the cross-section in the direction of the longitudinal axis 2 (axial) is shown in the direction of the vertical arrows 100, and the radial extension of the cross-section with respect to the axis 2 is shown in the direction of the horizontal arrows 101.

The longitudinal axis of the casting pattern 1 and of the underlying pattern body 1' is denoted by reference numeral 2 in the figures.

Figure 1B:
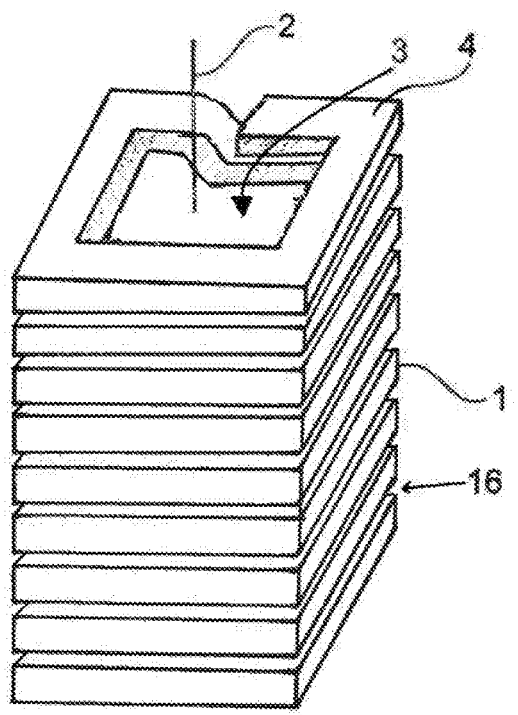

FIG. 1b shows a helical casting pattern 1 having a helical recess 16, wherein the underlying pattern body into which the recess 16 is introduced is cube-shaped and has a cube-shaped cavity 3. The edges of the pattern body may optionally be rounded. The outer dimensions of the pattern body as well as the dimensions of the cavity 3 are constant along the longitudinal axis 2 in the shown embodiment. In other embodiments, both dimensions or only one can vary along the longitudinal axis 2.

Figure 1C:
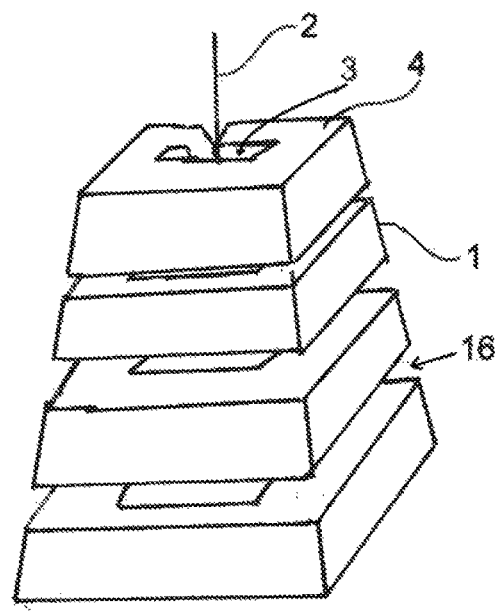

FIG. 1c shows an alternative embodiment of the helical casting pattern 1, wherein the casting pattern 1, or the underlying pattern body, has a square base surface and tapers upwardly in the direction of the longitudinal axis 2, whereby a frustrum of a pyramid is formed. The cavity likewise has a square base surface and tapers upwardly, thus also following the shape of a frustrum of a pyramid. The cavity 3 can taper to the same degree as the outer dimensions, so that a wall thickness of the pattern body wall 4 is kept constant. The cavity and outer dimensions, however, can also change differently, so that a wall thickness increases or decreases upwardly. In this way, the shape and thickness of the formed strand can vary in the radial direction.

Figure 1D:
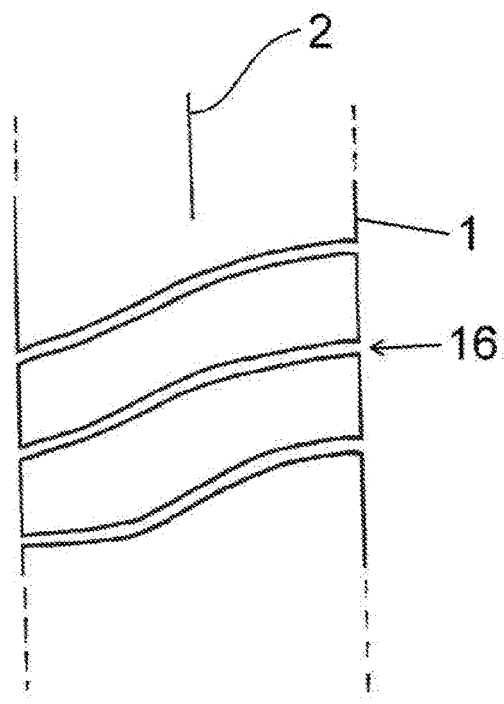
FIGS. 1d-1e show helical casting patterns in side views, according to embodiments of the disclosure.

FIG. 1d, by way of example, shows a side view of a casting pattern 1 including a recess 16, wherein the casting pattern 1 has a non-tapering shape along the longitudinal axis. This may be, for example, a cylinder having a round or elliptical base surface, or a cuboid having a rectangular or square base surface. A possible progression of the recess 16 is identified in FIG. 1d, wherein a pitch of the recess 16 varies on the shown side. In this way, the shape and the thickness of the formed strand can vary in the direction of the longitudinal axis 2.

Figure 1E:
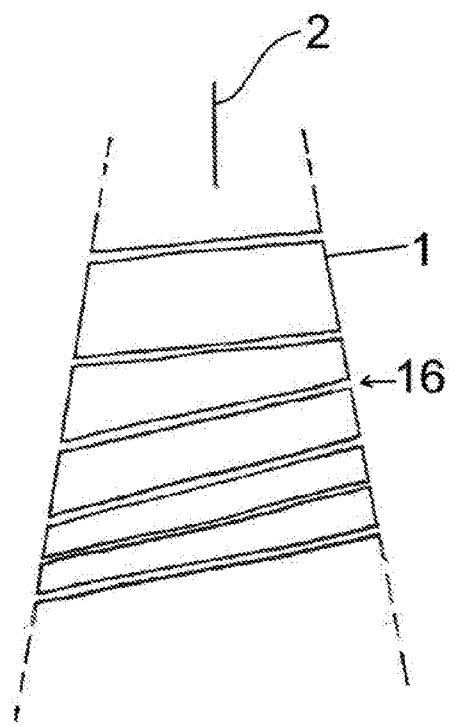

FIG. 1e shows a side view of a casting pattern 1 including a recess 16, wherein the underlying pattern body tapers upwardly, in contrast to the pattern body from FIG. 1d. Depending on the base surface of the pattern body, this may be a polyhedron, and in particular a frustrum of a pyramid or a frustrum of a cone. It is apparent in FIG. 1e that the pitch 16 of the recess varies along the longitudinal axis 2. Here as well, the thickness of the formed strand is varied in the direction of the longitudinal axis 2, as was also the case in FIG. 1d, by the variable pitch of the recess 16. For example, the thickness of the strand in the direction of the longitudinal axis 2 can be varied such that a cross-section of the strand is constant, while a thickness of the strand accordingly changes in the opposite manner in the radial direction.

Figure 2:
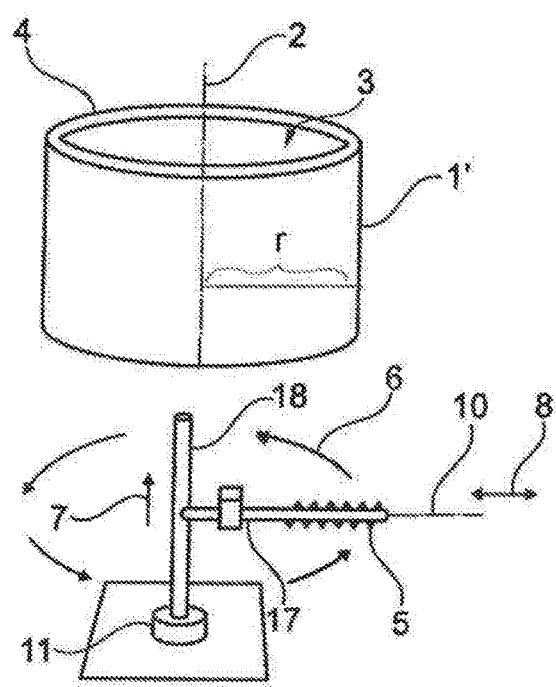
FIG. 2 shows a processing device for a pattern body, according to embodiments of the disclosure.

FIG. 2 schematically shows a section of a pattern body 1' in a perspective view, wherein, as in FIG. 1, the longitudinal axis is denoted by reference numeral 2, the cavity by reference numeral 3, and the pattern body wall/cylinder wall by reference numeral 4. Beneath the pattern body 1', a processing device comprising a processing tool 5 is shown schematically, which during a rotational movement, which is indicated by the arrow 6, can be pivoted about the longitudinal axis 2. For this purpose, the processing tool 5 is fastened to an arm 17, which, in turn, is fastened to a rotatably drivable shaft 18. The shaft 18 can be driven by way of a rotary drive 11.

Additionally, a second drive is provided in FIG. 2, which is not shown in greater detail and moves the processing tool 5 in a translatory manner in the direction of the arrow 7. Moreover, a further drive can be provided, which causes an oscillating movement of the processing tool 5 in the direction of the longitudinal axis 10 thereof, wherein the movement is schematically indicated by the double arrow 8.

Figure 5:
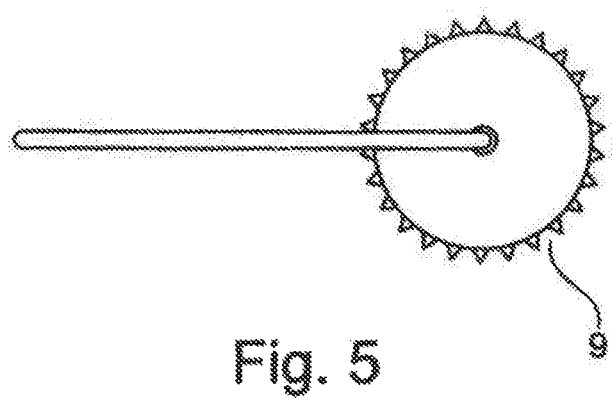
FIG. 5 shows an embodiment of a processing tool, according to embodiments of the disclosure.

The processing tool 5 can, for example, be implemented by a flat saw blade or a strand-shaped rasp body as well as a saw blade having a round cross-section. However, as is shown in FIG. 5, it may also include a circular saw blade 9, which can be driven separately.

The processing tool 5 is designed so as to be able to remove the material of the pattern body 1' so as to introduce the recess 16 into the pattern body. For this purpose, the processing tool 5 can, in principle, enable processing by way of eroding, in addition to processing by way of cutting, or melt the pattern body 1', as will be described hereafter.

Figure 3:
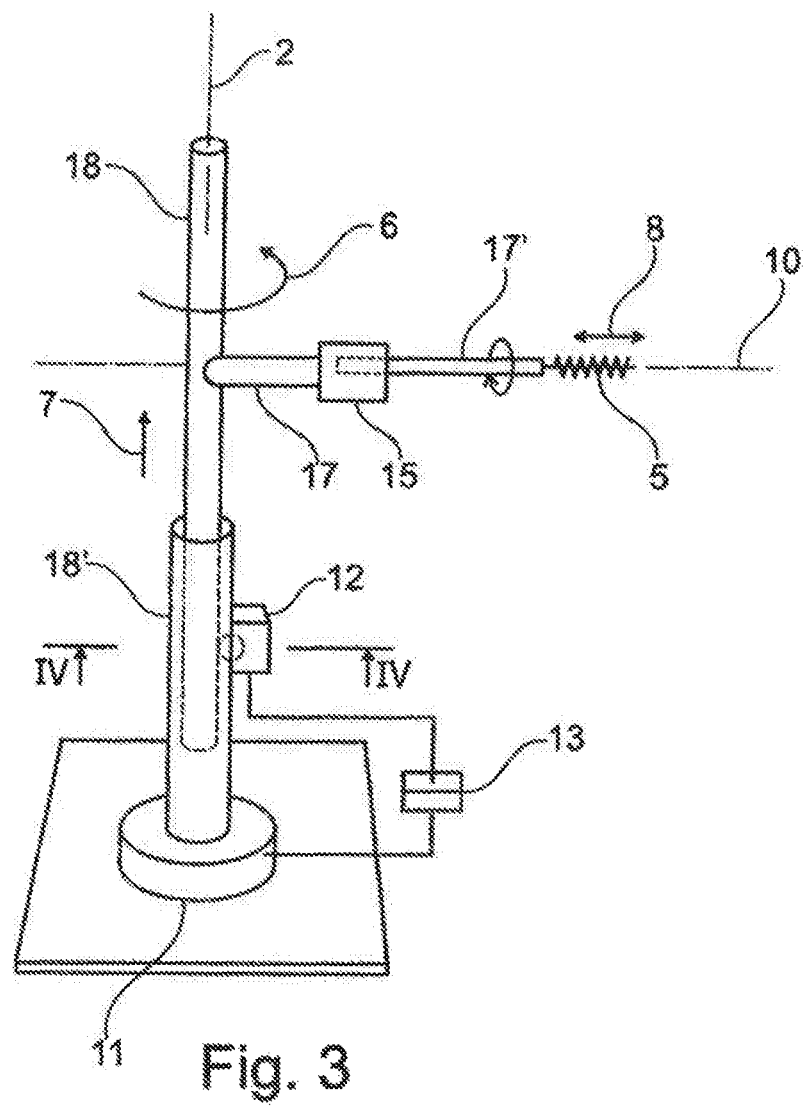
FIG. 3 shows the processing device from FIG. 2 in detail, according to embodiments of the disclosure.

FIG. 3 shows the processing device in greater detail in a perspective view. In the figure, the pattern body 1' to be processed has been omitted for the sake of clarity, however the longitudinal axis 2 thereof is plotted, which coincides with the longitudinal axis of the shaft 18. The shaft 18 is mounted in a telescoping tube 18', and can be driven together with the telescoping tube 18', or separately therefrom, by a rotary drive 11 in the direction of the arrow 6 within the scope of a rotational movement. Moreover, the shaft 18 can be advanced in a translatory manner inside the telescoping tube 18' in the direction of the arrow 7, wherein a second drive 12 for driving the shaft 18 or a further telescoping tube in which the shaft 18 can glide is provided in the direction of the arrow 7. The driving movements 6, 7 are matched to one another and controlled by a control unit 13 in such a way that, for example, a regular helical shape is implemented, with a simultaneous rotational movement and advancement movement by the processing tool 5. The ratio of the speeds of the drives 11, 12 can also be changed during the movement so that, for example, the pitch of the helix can be changed suddenly or steadily. Moreover, one of the movements may also be intermittently suspended, so that helical shapes other than regular shapes can be created.

Figure 4:
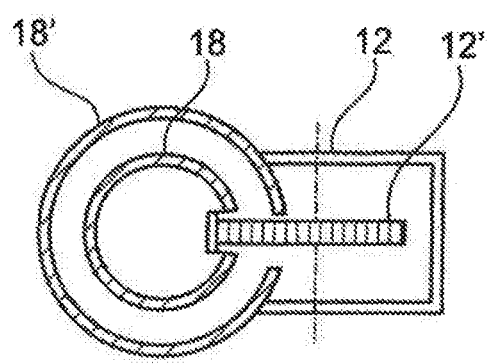
FIG. 4 shows a detail from FIG. 3 in a section indicated there, according to embodiments of the disclosure.

The function of the linear drive 12, the second drive, is shown in greater detail in FIG. 4. It is shown there that a gearwheel 12' is rotatably mounted and drivable within the second drive 12, the gear wheel engaging in a toothed rack integrated into the shaft 18 or a holding tube that slidably mounts the shaft 18, and thereby linearly drives the shaft 18 inside the telescoping tube 18'. The gear wheel 12' is usually driven by an electric motor, which can be electrically controlled by way of the control unit 13.

An arm 17, which carries an oscillating linear drive 15, is fastened to the shaft 18. The extension 17' of the arm 17 is moved in an oscillating manner by the linear drive 15 in the direction of the double arrow 18, along the axis 10 of the arm 17. The processing tool 5 in the form of a rasp, which is arranged at the end of the arm 17, thereby carries out a saw-like movement for removing material of the pattern body wall.

Figure 6:
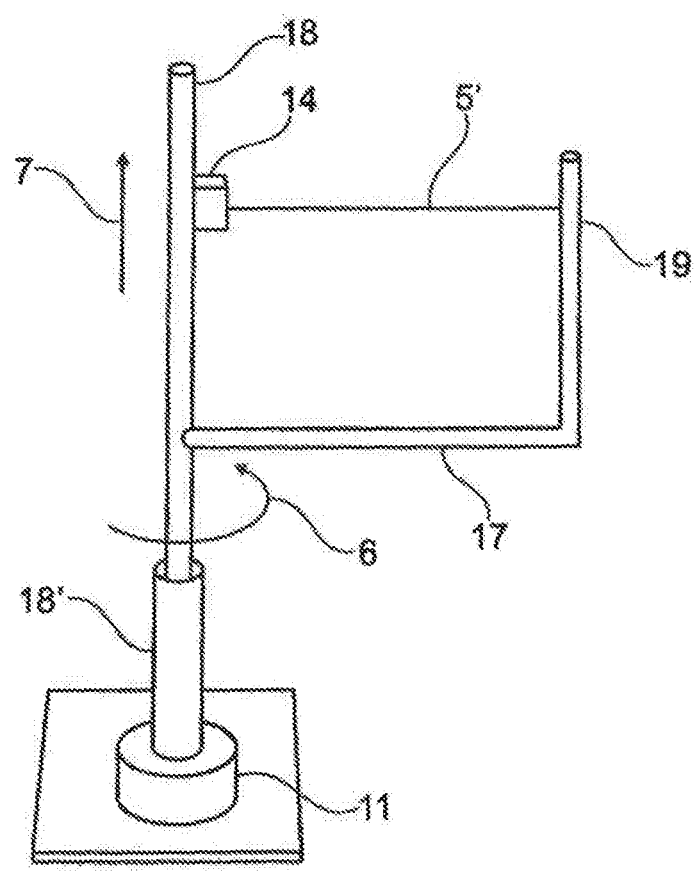
FIG. 6 shows a modified concept of the processing device, according to embodiments of the disclosure.

FIG. 6 shows a modified concept of the processing device, in which, in turn, a shaft 18 is rotatably drivable inside a telescoping tube 18' by way of a rotary drive 11 in the direction of the arrow 6, and in which the shaft 18 can moreover be driven by way of a linear drive, which is not shown in detail in FIG. 6, in the direction of the arrow 7.

The processing tool 5' is designed as a wire, which is tensioned between a heating device 14 and a holder 19 fastened to the arm 17. As a result of the heating wire 5' being heated by way of the heating device 14, the heating wire is brought to a temperature above the melting point of the material of the pattern body 1', so that the heating wire can be used for hot cutting and, in this way, introduces a recess 16 into the pattern body 1'. The heating device 14 can be designed as a current source, for example, which generates a heating current through the heating wire 5'/or the processing tool 5', so as to bring this to the necessary temperature.

As a result of the described embodiments of the processing device and the method, it is possible to produce a casting pattern 1 that allows the volume to be optimally filled by keeping the dimensions of the helical recess 16 small. In this way, a corresponding volume utilization by the metallic cast body created by way of the casting pattern 1 is also made possible.

Figure 7:
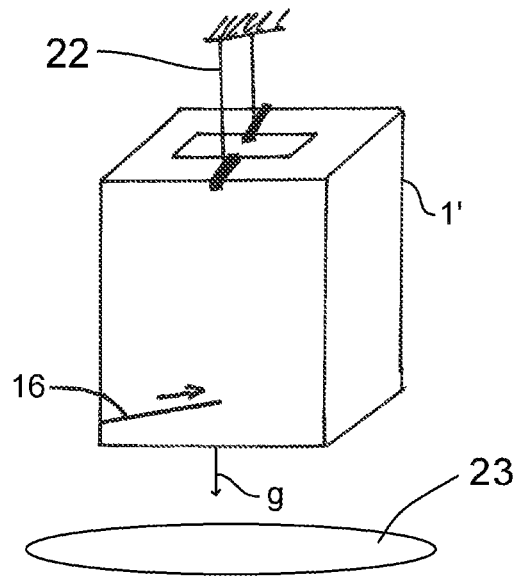
FIG. 7 shows a pattern body mounted in a suspended manner, according to embodiments of the disclosure.

FIG. 7 illustrates a method in which the pattern body 1' is mounted in a suspended manner during the creation of the recess 16. It is fastened in an upper region to a fastening device 22 and held by the fastening device 22. The recess 16 is introduced from the bottom to the top in the process, in direction of the arrow plotted in the figure. A processing tool is not shown in FIG. 7 for the sake of clarity. It may also be anchored in a suspended manner above the pattern body 1', but may also sit on a base. The downwardly acting weight g ensures that the strand being incrementally produced is pulled away downwardly. In this way, undesirable reconnection of the strand to the remaining pattern body, or a strand section located thereabove, can be avoided. This configuration can be used in connection with a hot processing tool, for example, when a risk of rejoining exists due to melting of the strand. The suspended mounting of the pattern body 1' can also be provided in other processing tools. The separated strand, hanging down, can be received by a receiving plate 23, which moves along with the pattern body, provided the pattern body is moved.

Figure 8A:
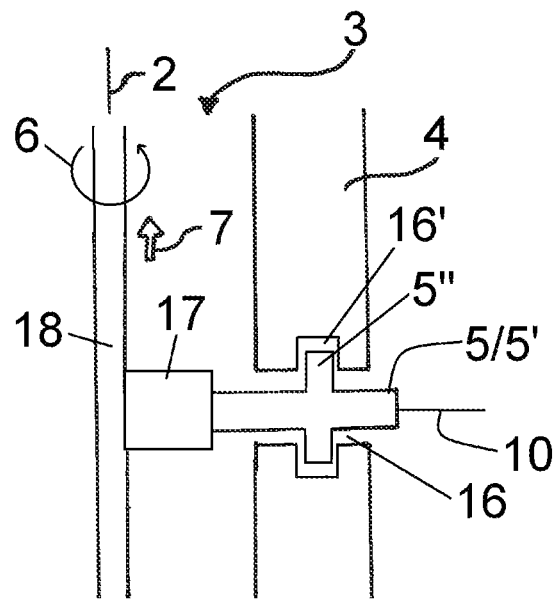
FIGS. 8a-8c show an introduction of grooves in pattern bodies, according to embodiments of the disclosure.
Figure 8B:
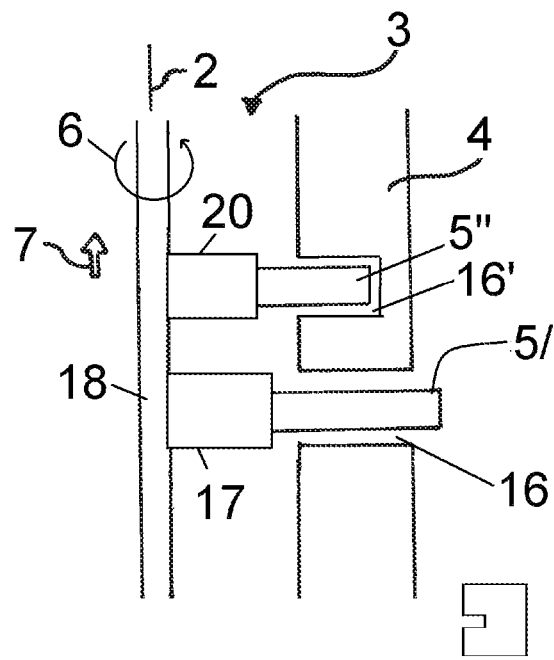
Figure 8C:
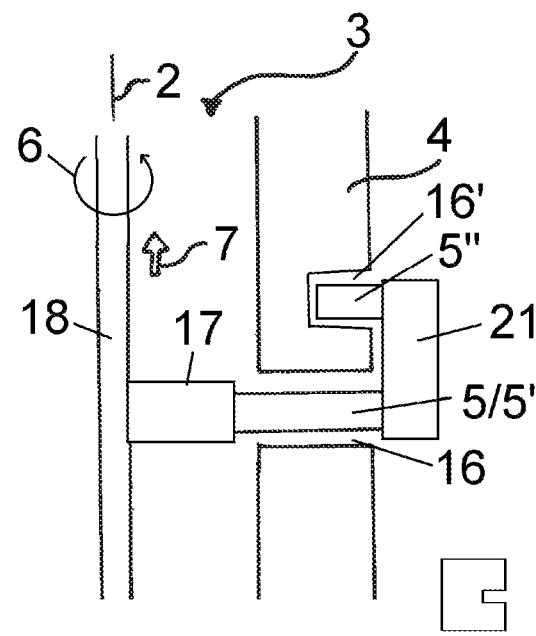

FIGS. 8*a* to 8*c* show possible embodiments of the processing device including a groove cutter 5″ for introducing a groove 16′.

FIG. 8*a* shows a groove cutter 5″, which is arranged at the processing tool 5, 5′ and, proceeding therefrom, extends in the direction of the longitudinal axis. A groove 16′ can thus be generated, which, proceeding from the recess 16, extends in the direction of the longitudinal axis 2.

For example, the processing tool 5, 5′ can be configured to rotate, together with the groove cutter 5″ arranged thereon, about the longitudinal axis 10 of the processing tool. However, it may also be designed as a non-rotating knife. In the latter case, that is, when an arrangement not rotating about the axis 10 is involved, but, for example, a cutting, for example a hot-cutting, arrangement, it is also possible to generate a groove only on the top side or only on the bottom side of the strand.

The bottom right of FIG. 8*a* shows the cross-section of the strand generated by way of the shown processing tool.

The shown processing tool may also be provided in addition to a processing tool without groove cutter, and may be arranged at a distance therefrom in the direction of the longitudinal axis at the shaft 18, so that a first recess 16 with the groove 16′, and a further recess 16 without groove, as was described in connection with the preceding figures, can be created. In terms of the ratio of the advancement speed to the rotational speed, care typically must be taken that, for the recesses, a pitch is achieved that is dimensioned so large that the two recesses do not make contact with one another.

FIGS. 8*b*, 8*c* show groove cutters 5″ by way of which, together with the introduction of the recess 16, a groove 16″ can be introduced into the pattern body 1′, which, proceeding from the inner side or the outer side, extends in the pattern body wall orthogonal to the longitudinal axis 2.

For example, the groove cutters 5″ can be designed as a knife, and in particular as a heated knife, or also as a circular saw blade.

In the embodiments from FIGS. 8*b* and 8*c* as well, care is typically taken in terms of the ratio of the advancement speed (along arrow 7) to the rotational speed (along arrow 6), that a pitch is achieved in each case for the recess 16 and the groove 16′ which is dimensioned such that the groove 16′ and the recess 16 do not make contact with one another. In this way, it can be achieved that the strand includes a groove along the windings on the inside (FIG. 8*b*) or on the outside (FIG. 8*c*).

The bottom right of FIGS. 8*b* and 8*c* again shows the cross-section of the strands generated by way of the shown processing tools.

The groove cutters from FIGS. 8*a*, 8*b* and 8*c* can be arbitrarily combined with one another. In this way, it is possible to generate strands that each include one or more grooves on one or more sides.

The dimensions or positions of the grooves 16′ that are introduced using the devices from FIGS. 8*a* to 8*c* can be established relative to the shaft 18 of the processing device. In particular, the radial distance thereof with respect to the shaft 18 can be established or establishable by the arm 17, or the second arm 17′, or the connecting piece 21. The dimensions of the pattern body are typically taken into consideration during the positioning of the groove cutters, so that the groove is generated at the desired location, at the desired depth. The use of the groove cutters is possible, in particular, with cylindrical pattern bodies, even if the movement of the processing tool is limited to a rotation and a relative movement along the longitudinal axis. In particular the groove cutter from FIG. 8*a*, however, can also be used with other pattern bodies having a sufficient wall thickness. However, it may also be provided in the method that, in addition to the rotational movement of the processing tool and/or of the pattern body, a second relative movement takes place between the processing tool and the pattern body, which is oriented orthogonal to the longitudinal axis, wherein the rotational movement and/or the relative movement, along the longitudinal axis, are superimposed by the second relative movement, at least during a portion of the second relative movement, and/or wherein the rotational movement and/or the relative movement, along the longitudinal axis, are interrupted during the second relative movement, at least during a portion of the second relative movement. For example, in the case of oval or rectangular pattern bodies, corresponding curve tracks can be selected, resulting, for example, in a constant distance between the point undergoing processing and the center. In this way, it is in particular made possible to also introduce grooves or other functional contours into components that are not rotation-symmetrical, or, for example, to round edges. As a result of the aforementioned second relative movement, it is also possible, however, to control or vary a certain progression of a groove, or a depth of a groove (both in the case of bodies that are rotation-symmetrical and those that are not rotation-symmetrical).

Figure 9:
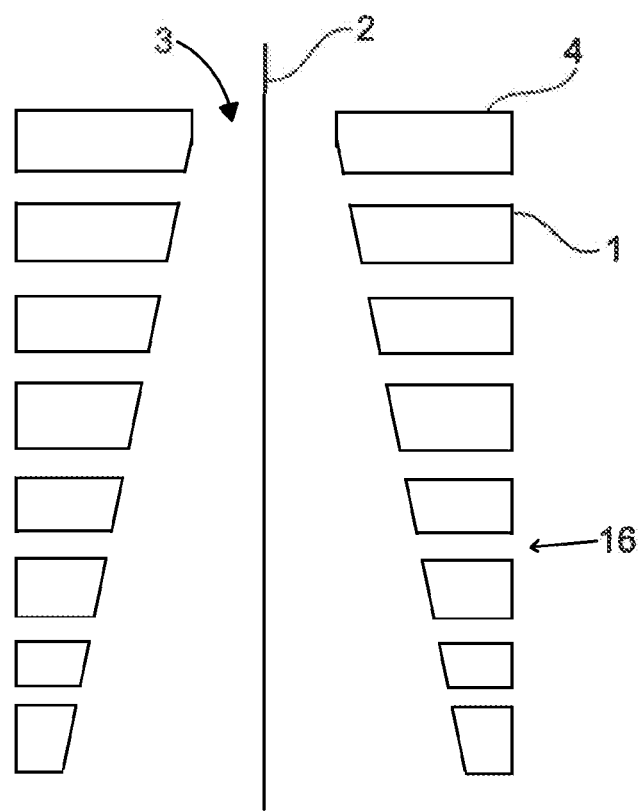
FIG. 9 shows a helical casting pattern having a variable wall thickness along its longitudinal axis.

FIG. 9 shows a cut view of a helical casting pattern 1 having a variable wall thickness along its longitudinal axis. The cavity 3 varies along the longitudinal axis 2 of the pattern body, by extending conically or in a pyramid shape. This results in a variable wall thickness of the pattern body wall along the longitudinal axis 2 of the pattern body. These measures result in a variable thickness of the windings of the resulting coil or spring in the cast body created later.

The invention claimed is:

1. A method for producing a helical casting pattern, comprising:
   providing a strand-shaped pattern body having a centric longitudinal axis, a centric cavity extending in the direction of the centric longitudinal axis, and a pattern body wall that surrounds the centric cavity;
   providing a processing tool for creating a recess;
   arranging the strand-shaped pattern body and the processing tool such that the processing tool extends entirely through the pattern body wall in a radial direction with respect to the longitudinal axis; and
   driving, in a rotatory manner, at least one of the processing tool and the strand-shaped pattern body about one of the longitudinal axis of the strand-shaped pattern body and an axis parallel thereto, in order to create a relative rotational movement between the processing tool and the strand-shaped pattern body, and
   driving, in a translatory manner, at least one of the processing tool and the strand-shaped pattern body, along a direction parallel to the longitudinal axis, in order to create a relative translational movement between the strand-shaped pattern body and the processing tool in the direction parallel to the longitudinal axis,
   the relative translational movement being produced one of continuously or at least intermittently during or in alternation with the relative rotational movement, while the processing tool extends entirely through the pattern body wall, such that the processing tool at least one of displaces, removes, and erodes material of the strand-shaped pattern body, in accordance with the relative translational movement and the relative rotational movement, in order to create a through-recess in the pattern body wall, the relative rotational movement and the relative translational movement being controlled in such a way that the through-recess is created with a helical shape, wherein the pattern body wall has a varying wall thickness along the longitudinal axis, in order to create a varying winding thickness in windings of the helical casting pattern, wherein, while the trough-recess is being created, the strand-shaped pattern body is mounted in a suspended manner, an upper region of the strand-shaped pattern body being held by a fastening device, the through-recess being introduced from the bottom to the top of the strand-shaped pattern body; and wherein a receiving plate is arranged beneath the strand-shaped pattern body, which moves along with the strand-shaped pattern body in a rotatory and translatory manner and receives a strand of the strand-shaped pattern body that is pulled downwardly due to gravity as the trough-recess is being introduced.

2. The method of claim 1, wherein at least one of a rotational speed of the relative rotational movement between the processing tool and the strand-shaped pattern body and a translational speed of the relative translational movement between the processing tool and the strand-shaped pattern body in the direction of the longitudinal axis remains constant during at least a time segment of the production of the helical casting pattern.

3. The method of claim 1, wherein at least one of a rotational speed of the relative rotational movement between the processing tool and the strand-shaped pattern body and a translational speed of the relative translational movement between the processing tool and the strand-shaped pattern body in the direction of the longitudinal axis is changed during the production of the helical casting pattern.

4. The method of claim 1, wherein two or more processing tools are moved simultaneously and/or jointly relative to the strand-shaped pattern body.

5. The method of claim 1, wherein the processing tool includes one of a strand or strip that is retained between two bearing points and held tautly during movement of the strand-shaped pattern body and the processing tool.

6. The method of claim 1, wherein the processing tool includes one of a strand-shaped or strip-shaped processing body that is exclusively held at a first end thereof.

7. The method of claim 1, wherein the processing tool comprises a rotatably drivable circular disk.

8. The method of claim 1, comprising a second relative movement between the processing tool and the strand-shaped pattern body, which is oriented orthogonal to the longitudinal axis, wherein the relative rotational movement and/or the relative translational movement along the longitudinal axis is/are superimposed at least intermittently by the second relative movement or wherein the relative rotational movement and/or the relative translational movement along the longitudinal axis is/are at least intermittently interrupted during the second relative movement.

9. The method of claim 1, wherein the processing tool is heated during production of the helical casting pattern.

10. The method of claim 1, wherein the processing tool has a strand-shaped design and is rotatably driven about its longitudinal axis during production of the helical casting pattern.

11. The method of claim 1, wherein the processing tool has a strand-shaped design and moves in at least one of a vibrating manner and an oscillating manner in the direction of its longitudinal axis during production of the helical casting pattern.

12. The method of claim 1, wherein the strand-shaped pattern body has one of a rectangular base surface and a round base surface, and outer dimensions of the strand-shaped pattern body represent one or more of a polyhedron, a cuboid, a frustum of a pyramid, a cylinder, and a frustum of a cone.

13. The method of claim 1, wherein a groove is introduced together with the through-recess into the strand-shaped pattern body, which extends in the pattern body wall, proceeding from one of inside and outside, orthogonal to the longitudinal axis, or which, proceeding from the through-recess, extends in the direction of the longitudinal axis.

14. The method of claim 1, wherein a helical strand is formed from the strand-shaped pattern body as the through-recess is introduced, and wherein a contour of the strand is processed at the same time that the through-recess is introduced, by way of the processing tool.

15. The method of claim 14, wherein the contour includes at least one of one or more cooling fins and one or more positioning aids and one or more mounting aids and one or more cooling channels.

16. The method of claim 1, wherein a helical strand is formed from the strand-shaped pattern body as the through-recess is introduced, and wherein a depression is introduced on one or more sides of the strand so as to create a cooling channel, and the depression is then closed.

17. A method for producing a helical casting pattern, comprising:

providing a strand-shaped pattern body having a centric longitudinal axis, a centric cavity extending in the direction of the centric longitudinal axis, and a pattern body wall that surrounds the centric cavity;

providing a processing tool for creating a recess;

arranging the strand-shaped pattern body and the processing tool such that the processing tool extends entirely through the pattern body wall in a radial direction with respect to the longitudinal axis; and driving, in a rotatory manner, at least one of the processing tool and the strand-shaped pattern body about one of the longitudinal axis of the strand-shaped pattern body and an axis parallel thereto, in order to create a relative rotational movement between the processing tool and the strand-shaped pattern body, and driving, in a translatory manner, at least one of the processing tool and the strand-shaped pattern body, along a direction parallel to the longitudinal axis, in order to create a relative translational movement between the strand-shaped pattern body and the processing tool in the direction parallel to the longitudinal axis, the relative translational movement being produced one of continuously or at least intermittently during or in alternation with the relative rotational movement, while the processing tool extends entirely through the pattern body wall, such that the processing tool at least one of displaces, removes, and erodes material of the strand-shaped pattern body, in accordance with the relative translational movement and the relative rotational movement, in order to create a through-recess in the pattern body wall, the relative rotational movement and the relative translational movement being controlled in such a way that the through-recess is created with a helical shape, wherein, while the through-recess is being created, the strand-shaped pattern body is mounted in a suspended manner, an upper region of the strand-shaped pattern body being held by a fastening device, the through-recess being introduced from the bottom to the top of the strand-shaped pattern body, wherein a receiving plate is provided beneath the processing tool, which receives a strand of the strand-shaped pattern body that is pulled downwardly due to gravity as the through-recess is being introduced, wherein the receiving plate moves along in a rotatory and/or translatory manner to prevent excessive deformation of the strand, wherein the receiving plate is arranged beneath the strand-shaped pattern body, wherein the receiving plate moves along with the strand-shaped pattern body in a rotatory and translatory manner.

\* \* \* \* \*